(12) United States Patent
Ulmer

(10) Patent No.: US 10,058,073 B1
(45) Date of Patent: Aug. 28, 2018

(54) ANIMAL TAG ATTACHMENT TOOL

(71) Applicant: Arrow Tag, LLC, Mobridge, SD (US)

(72) Inventor: Kim G. Ulmer, Mobridge, SD (US)

( * ) Notice: Subject to any disclaimer, the term of this patent is extended or adjusted under 35 U.S.C. 154(b) by 0 days.

(21) Appl. No.: 15/670,215

(22) Filed: Aug. 7, 2017

(51) Int. Cl.
*B23P 11/00* (2006.01)
*A01K 11/00* (2006.01)
*G09F 3/12* (2006.01)

(52) U.S. Cl.
CPC .............. *A01K 11/001* (2013.01); *G09F 3/12* (2013.01)

(58) Field of Classification Search
CPC . B23Q 3/00; B23Q 3/06; B23Q 3/068; B23Q 3/082; B23Q 3/154
See application file for complete search history.

(56) References Cited

U.S. PATENT DOCUMENTS

| 421,680 | A | | 2/1890 | Nagy |
| 4,059,074 | A | | 11/1977 | Furer et al. |
| 4,121,591 | A | * | 10/1978 | Hayes ................. A01K 11/002 227/144 |
| 4,359,015 | A | | 11/1982 | Ritchey |
| 4,516,577 | A | * | 5/1985 | Scott ................. A01K 11/002 227/144 |
| 4,748,757 | A | | 6/1988 | Howe |
| 5,234,440 | A | * | 8/1993 | Cohr ................. A01K 11/002 40/300 |
| 5,308,351 | A | | 5/1994 | Nehls |
| 6,021,592 | A | | 2/2000 | Caisley |
| 6,098,324 | A | | 8/2000 | Nepote |
| 6,235,036 | B1 | * | 5/2001 | Gardner ............... A01K 11/002 606/117 |
| 9,215,862 | B2 | * | 12/2015 | Bladen ................. A01K 11/002 |

(Continued)

FOREIGN PATENT DOCUMENTS

GB 2315463 B 3/1999

OTHER PUBLICATIONS

U.S. Patent and Trademark Office, "Office Action", U.S. Appl. No. 15/670,167, dated Sep. 6, 2017, pp. 1-8.

(Continued)

*Primary Examiner* — Lee D Wilson
(74) *Attorney, Agent, or Firm* — Pederson IP, LLC

(57) ABSTRACT

An attachment tool for an animal tag is disclosed. The attachment tool includes a first tag interface that mates with a male portion of the animal tag, and a second tag interface that mates with a female portion of the animal tag. The first tag interface and the second tag interface dispose the male portion of the tag in an aligned and opposing relationship with the female portion of the tag while the male portion of the tag is mounted on the first tag interface and the female portion of the tag is mounted on the second tag interface. An arm extends adjacent the first tag interface to at least the second tag interface and the second tag interface is disposed on the arm. A guard extends outward proximate the first tag interface toward the second tag interface. A distal portion of the guard and an opposing structure of the arm proximate the second tag interface define a gap therebetween, the gap extending into a region between the first tag interface and the second tag interface. A drive moves the male portion of the animal tag disposed on the first tag interface towards the female portion of the tag disposed on the second tag interface to connect the male portion with the female portion.

25 Claims, 3 Drawing Sheets

(56) References Cited

U.S. PATENT DOCUMENTS

| | | | |
|---|---|---|---|
| 2002/0148146 A1 | 10/2002 | Hogan | |
| 2007/0101626 A1* | 5/2007 | Connole | A01K 11/003 40/300 |
| 2009/0077844 A1 | 3/2009 | Wijk et al. | |
| 2009/0078762 A1 | 3/2009 | Forster et al. | |
| 2011/0270266 A1* | 11/2011 | Ritchey | A01K 11/002 606/117 |
| 2011/0270267 A1* | 11/2011 | Ritchey | A01K 11/002 606/117 |
| 2012/0030977 A1 | 2/2012 | Knapp | |
| 2012/0285056 A1 | 11/2012 | Corrales | |
| 2013/0175347 A1 | 7/2013 | Decaluwe et al. | |
| 2013/0204159 A1* | 8/2013 | Destoumieux | A61B 10/0266 600/564 |

OTHER PUBLICATIONS eartagcentral.com, "840 EID (RFID) Tags", Accessed from the Internet: http://eartagcentral.com/home.php?cat=258 on Jul. 7, 2017, pp. 1-6.

eartagcentral.com, "840 Visual Tags", Accessed from the Internet: http://eartagcentral.com/home.php?cat=310 on Jul. 7, 2017, pp. 1-5.

eartagcentral.com, "Electronic (EID) Identification", Accessed from the Internet: http://eartagcentral.com/home.php?cat=250 on Jul. 7, 2017, pp. 1-7.

eartagcentral.com, "Official USDA Swine Premise (PIN) Tags", Accessed from the Internet: http://eartagcentral.com/home.php?cat=340 on Jul. 7, 2017, pp. 1-2.

eartagcentral.com, "Taggers and Accessories", Accessed from the Internet: http://eartagcentral.com/home.php?cat=251 on Jul. 7, 2017, pp. 1-5.

eartagcentral.com, "Visual ID Tags", Accessed from the Internet: http://eartagcentral.com/home.php?cat=249 on Jul. 7, 2017, pp. 1-11.

HID Global, "Animal ID", Accessed from the Internet: https://www.hidglobal.com/products/rfid-tags/identification-technologies/glass-tags-animals on Jul. 7, 2017, pp. 1-4.

Interpuls S.P.A., "Heat Detection & Eating Monitoring", Accessed from the Internet: http://www.interpuls.com/products/automation/heat-detection-eating-monitoring.html on Jun. 12, 2017, pp. 1-6.

Ketchum Manufacturing Inc., "Livestock Supplies", Accessed from the Internet: http://www.ketchum.ca/catalogues on Jul. 7, 2017, pp. 1-28.

Ketchum Manufacturing Inc., "Meat & Poultry Processing", Accessed from the Internet: http://www.ketchum.ca/catalogues on Jul. 7, 2017, pp. 1-20.

Ketchum Manufacturing Inc., "Seafood Marketing & Identification Products", Accessed from the Internet: http://www.ketchum.ca/catalogues on Jul. 7, 2017, pp. 1-20.

Kupsan Tag Company, "Product Catalogue", Accessed from the Internet: http://www.kupsan.net/electronic-ear-tags.html on Jul. 7, 2017, pp. 1.

Livestock Concepts, "Bock's Dewlap Boc-Loc Brisket Tags—Blank", Accessed from the Internet: http://livestockconcepts.com/en/identification/434-bock-s-dewlap-boc-loc-brisket-tags-blank.html on Jul. 7, 2017, pp. 1-2.

Livestock Concepts, "Bock's Toggle Punch", Accessed from the Internet: http://livestockconcepts.com/en/identification/2672-bock-s-toggle-punch.html on Jul. 7, 2017, pp. 1-2.

U.S. Patent and Trademark Office, "Notice of Allowance", U.S. Appl. No. 15/670,167, dated Jan. 11, 2018, pp. 1-6.

World Intellectual Property Organization (WIPO), "International Search Report", Application No. PCT/IB2018/051248, dated May 28, 2018, pp. 1-5.

World Intellectual Property Organization (WIPO), "Written Opinion", Application No. PCT/IB2018/051248, dated May 28, 2018, pp. 1-7.

* cited by examiner

ANIMAL TAG ATTACHMENT TOOL

BACKGROUND

Identification tags, known simply as "ID tags", are ubiquitous in livestock farming. In many cases multiple ID tags are present on a single animal. For example, a first ID tag may be used to attach a government (e.g., state) ID to an animal, a second ID tag may be used to attach an owner ID to the animal, and a third tag may be used to attach an organizational ID (e.g., for the meat and livestock association (MLA)). Other ID tags may be used to attach other identifiers to an animal.

ID tags can include a large surface for displaying of a visual identifier, usually a number or combination of numbers and letters, and/or can include a radio frequency identification (RFID) circuit. When energized, the RFID circuit can emit a signal including an identification number for the animal. RFID circuits can also store and transmit other information such as the properties at which an animal has been located.

Most ID tags are designed for and attached to an ear of the animal. The ear is used primarily because the flap of the ear is a large exposed area of thin skin with few blood vessels or nerves allowing for relatively easy attachment and minimal discomfort for the animal. These "ear tags" are attached by making an opening through the flap of the ear and placing a neck portion of the tag through the opening. Respective enlarged portions are on each end of the neck of the tag and are positioned on respective sides of the ear to prevent the tag from sliding out of the opening.

Ear tags come in one-piece and two-piece designs. The two-piece designs include a first piece with a neck having one enlarged portion on one end and a separate second piece having a second enlarged portion. The neck of the first piece can be inserted through the opening in the ear flap, and the second piece can subsequently be connected to the free end of the neck on the side of the ear opposite the first enlarged portion. The one-piece designs typically include a hinged member that can align with the neck to be slid through the opening in the ear flap and be subsequently rotated perpendicular to the neck to prevent the neck from sliding back through the opening.

The ear tag is attached through the use of an attachment tool. The attachment tool is often a plyers-like implement that brings two opposing surfaces together with the ear flap therebetween. The ear tag is placed on one opposing surface (or on both in a two-piece design) of the tool and is pressed, using the tool, through the ear flap of the animal. Other attachment tool designs exist including a pneumatic design that uses air pressure to force an ear tag through an ear flap.

The opening in the ear flap is typically made simultaneously with attachment of the ear tag. The attachment tool can have a pointed end that sticks out in front of the tag (e.g., through an aperture extending longitudinally through the neck of the tag) to create an initial opening. Alternatively, the tag itself can have a rigid pointed end to create an initial opening. This initial opening is typically smaller than a diameter of the neck of the tag. The initial opening is enlarged by forcing a cone shape end of the neck portion of the tag into and through the initial opening. This action enlarges the initial opening and pushes the neck portion through that enlarged opening. Once the neck portion extends sufficiently out of the reverse side of the ear flap, the second piece can be attached to the neck or the hinged portion can be rotated to prevent the neck from being pulled back out of the opening. Often, attachment of the female portion or rotation of the hinged portion is accomplished by the attachment tool during the same movement of the opposing surfaces towards each other that creates the opening and presses the neck through; resulting in creation of the opening and complete attachment of the ear tag with a single squeeze of the attachment tool.

ID tags can also be attached to animals in other locations including under the skin (for RFID tags), as necklaces, ankle bracelets, and in the brisket region of a cow. A tag attached in the brisket region of a cow, a so-called "brisket tag", resembles a padlock with a U-shaped metal bar that extends through an opening made in the brisket region of a cow. A plastic member attaches to the free ends of the U-shaped bar to provide a block that prevents the U-shaped bar from sliding out of the opening. The plastic member also provides a surface for disposing of a visual identifier. To attach the brisket tag, the hair in the brisket region at which the opening is to-be-made is shaved, and a punch applicator is used to punch an opening through the flap of skin. The U-shaped metal bar is then placed through the opening and the plastic member is attached to the ends of the U-shaped bar.

As compared to an ear tag, a brisket tag can provide a higher degree of security as ear tags can more easily be surreptitiously cut or pulled-out of an ear. Despite this increased security, the brisket tags can be much more difficult to attach, because of the multiple steps required including shaving the skin, creating the opening, and inserting the U-bar through the opening, and securing the U-bar. Additionally, the brisket region of the cow can be less accessible than an ear flap of the cow. Attachment of brisket tags can also be difficult because it can be difficult to re-locate the opening in the flap of skin for inserting of the U-bar after the opening is created with the punch. Finally, the U-shaped bar in combination with the plastic member forms a ring in which other items can get caught, such as material of a fence. If a brisket tag does get caught in a fence, it may be ripped out when the cow moves away, causing both pain to the cow and loss of the tag.

BRIEF DESCRIPTION

Embodiments for an attachment tool for an animal tag are disclosed. The attachment tool includes a first tag interface that mates with a male portion of the animal tag, and a second tag interface that mates with a female portion of the animal tag. The first tag interface and the second tag interface dispose the male portion of the tag in an aligned and opposing relationship with the female portion of the tag while the male portion of the tag is mounted on the first tag interface and the female portion of the tag is mounted on the second tag interface. An arm extends adjacent the first tag interface to at least the second tag interface and the second tag interface is disposed on the arm. A guard extends outward proximate the first tag interface toward the second tag interface. A distal portion of the guard and an opposing structure of the arm proximate the second tag interface define a gap therebetween, the gap extending into a region between the first tag interface and the second tag interface. A drive moves the male portion of the animal tag disposed on the first tag interface towards the female portion of the tag disposed on the second tag interface to connect the male portion with the female portion.

Other embodiments for an attachment tool for an animal tag are also disclosed. The other embodiments include a first tag interface having a geometry that mates with a male portion of the animal tag and a second tag interface having a geometry that mates with a female portion of the animal tag. The first tag interface and the second tag interface dispose the male portion of the tag in an aligned and opposing relationship with the female portion of the tag while the male portion of the tag is mounted on the first tag interface and the female portion of the tag is mounted on the second tag interface. The attachment tool also includes a shank and a drive linkage coupling the shank to the first tag interface. The drive linkage rotates the first tag interface when the shank is rotated, the drive linkage also moving the first tag interface axially toward the second tag interface while rotating the first tag interface when the shank is rotated.

Embodiments for a method for an attachment tool to attach a tag to an animal are also disclosed. The attachment tool includes a first tag interface disposed in an opposing and aligned relationship to a second tag interface. The method includes rotating the first tag interface with a male portion of the tag disposed thereon and moving the first tag interface along its axis of rotation towards the second tag interface opposite of the first tag interface. The second tag interface has the female portion of the tag disposed thereon. The first tag interface moves a distance sufficient to connect the male portion of the tag to the female portion.

Other embodiments for an attachment tool for attaching an animal tag to an animal are also disclosed. The attachment tool includes a main portion and a first tag interface configured to have a first portion of a tag disposed thereon. The first tag interface is disposed proximate the main portion. The tool includes an arm extending from the main portion, and a second tag interface configured to have a second portion of the tag disposed thereon. The second tag interface is disposed on the arm and disposed opposite the first tag interface. The attachment tool simultaneously rotates the first tag interface and moves the first tag interface towards the second tag interface to connect the first portion of the tag to the second portion of the tag.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
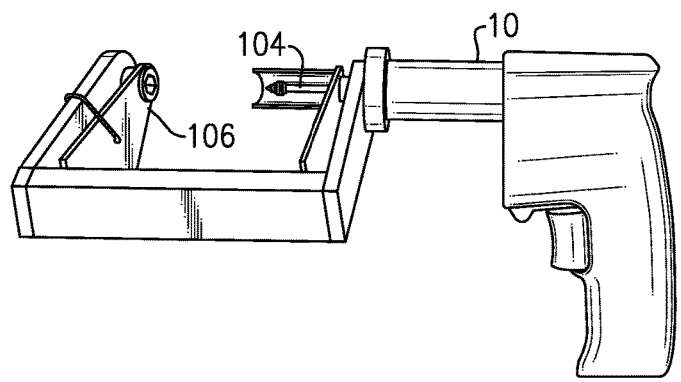
FIG. 1 is a perspective view of an example attachment tool for attaching an animal tag to an animal.

FIG. 1 is a perspective view of an example attachment tool 10 for a two-piece animal tag. The two-piece animal tag includes a male portion 104 and a female portion 106. Both the male portion 104 and a female portion 106 are mounted in the attachment tool 10 for attachment of the tag to an animal. An example tag that can be used in the tool 10 is described in co-pending U.S. patent application Ser. No. 15/670,176, titled "ANIMAL IDENTIFICATION TAG", which is hereby incorporated herein by reference. The attachment tool 10 is configured to drive the male portion 104 of the tag through a portion of an animal (e.g., through a dewlap or brisket region of a cow) such that the male portion 104 extends all the way through the animal portion and attaches to the female portion.

The tool 10 includes a drive for moving the male portion 104 of the tag through the portion of animal towards the female portion 106 of the tag. The drive moves the male portion 104 of the tag in a direction coincident with a central longitudinal axis thereof. The drive can have sufficient power to force the male portion 104 through the tough skin/leather of the dewlap or brisket region of the cow. In an example, the drive is a linear actuator. The linear actuator can push the male portion 104 from a back end thereof towards the female portion 106. Any suitable linear actuator can be used including a mechanical, hydraulic, pneumatic, electro-mechanical, or other linear actuator. In an example, the linear actuator moves a piston contacting the male portion 104 in the direction coincident with the longitudinal axis in order to move the male portion. In another example, the linear actuator uses fluid force (e.g., pneumatic pressure) directly on the male portion 104 along with a guide for the motion of the male portion 104 to move the male portion 102 in the direction coincident with the longitudinal axis. The power source for the drive can be manual (e.g., hand squeezing) or non-manual (e.g., electric).

In example, the drive provides little or no rotation about the central longitudinal axis, to the male portion 104 of the tag. In such an example, the male portion 104 can be shot quickly through the portion of the animal or pressed more slowly through. In another example, the drive can rotate the male portion 104 about its longitudinal axis while the drive moves the male portion 104 in a direction coincident with the longitudinal axis. In any case, the tag installed in the tool is adapted to cut though the portion of the animal using the motion (linear, or linear and rotation) provided by the tool 10. For example, a male portion 104 with broadhead form sharp edges on a tip thereof can be used with a drive that provides linear force with little or no rotational force. A male portion 104 with a helical sharp edge thereon can be used with a drive that provides linear and rotation force to drill through the portion of the animal. Example tags having broadhead forms and helical sharp edges are provided in the co-pending U.S. patent application Ser. No. 15/670,176, titled "ANIMAL IDENTIFICATION TAG".

Figure 2:
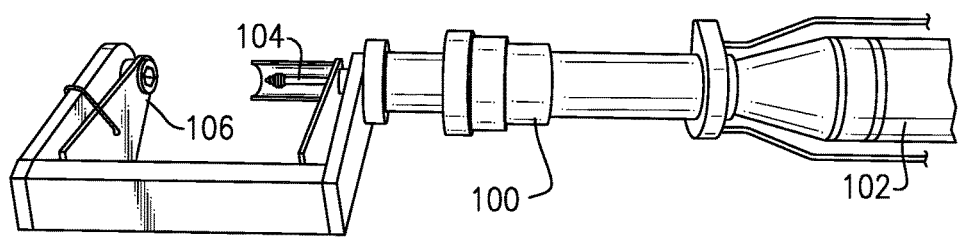
FIG. 2 is a perspective view of an example attachment tool mounted on a rotary tool.

FIG. 2 is an example attachment tool 100 having a drive that provides linear and rotational motion to the male portion 104. In this example, the attachment tool 100 is to-be-connected to a hand-held rotary tool 102, which is used to power the attachment tool 100. The hand-held rotary tool 102 can be any tool that provides rotational force such as a drill or a smaller rotary tool. The rotary tool 102 can be rotated by any suitable motor including an electric motor, a pneumatic motor, or a hydraulic motor. In other examples, a motor (e.g., electric, pneumatic, or hydraulic) is included in the tool 100 itself and a separate hand-held rotary tool is not used. An interface for a power source, or the power source itself, for such a motor can also be incorporated into the tool 100, such as an interface for a battery or a container of compressed air.

When activated, the tool 100 rotates the male portion 104 of the tag while simultaneously moving the male portion 104 towards the female portion 106. The tool 100 continues rotating the male portion 104 and moving it towards the female portion 106 until the male portion 104 connects to the female portion 106. To attach the tag to an animal, the portion of the animal to which the tag is to-be-attached is placed between the male portion 104 and the female portion 106 of the tag while the male portion 104 and the female portion 106 are mounted in the tool 100, and prior to the tool 100 being activated. The rotary tool 102 is then activated, which provides rotational power to the tool 100. The tool 100, in turn, rotates the male portion 104 of the tag and moves the male portion 104 towards the female portion 104 as described above. This rotation and axial movement of the male portion 104 causes the male portion 104 to drill through the portion of animal disposed between the male portion 104 and female portion 106. Eventually the male portion 102 drills all the way through the portion of the animal and connects to the female portion 106 on the other side. With the male portion 104 drilled through the portion of animal and connected to the female portion 106, the tag is attached to the animal. The tag can then be de-mounted from the tool 100, and will remain attached to the animal. In an example, the tool 100 can be positioned with the dewlap or brisket region of a cow between the male portion 104 and the female portion 106 to attach the tag to that region of the cow.

Figure 3:
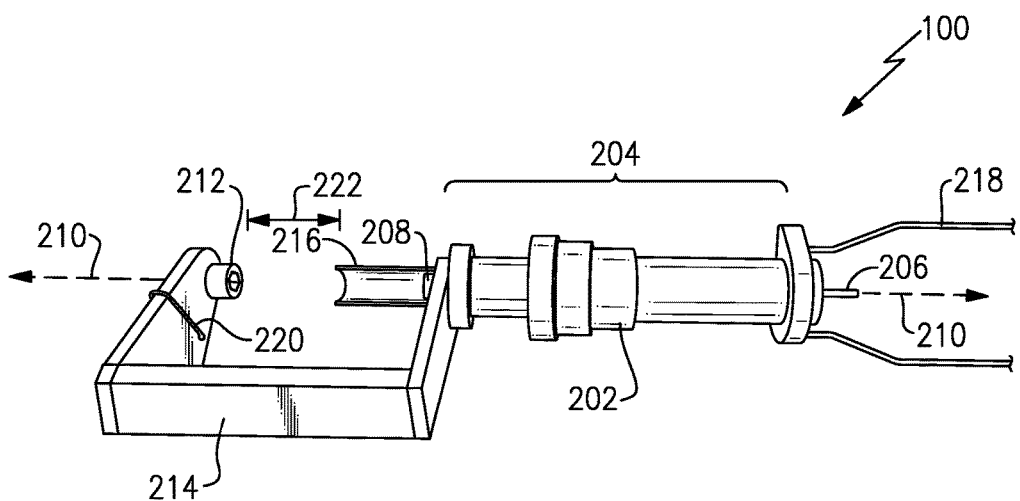
FIG. 3 is a perspective view of the attachment tool of FIG. 2 detached from the rotary tool and without a tag mounted therein.

FIG. 3 is another perspective view of the tool 100. The tool 100 includes a body 202 that connects the tool 100 to the hand-held rotary tool 102 and houses moving components of the tool 100. The body 202 includes a main portion 204 that houses a drive linkage. The drive linkage mechanically couples a shank 206 to a first tag interface 208. The shank 206 is configured for grasping in a chuck of the rotary tool 102, such that the shank 206 rotates along with the chuck during activation of the rotary tool 102. The drive linkage translates the rotation of the shank 206 to rotation of the first tag interface 208 along with movement of the first tag interface 208 in an axial direction. The first tag interface 208 is rotated about a rotation axis 210, which can also be the rotation axis of the shank 206. The axial movement of the first tag interface 208 occurs in a direction parallel to (e.g., along) the rotation axis 210. This axial movement moves the first tag interface 208 towards a second tag interface 212, which can be stationary with respect to the body 202. Any suitable drive linkage can be used including one or more gear drives, belt drives, universal joint drives, fluid (e.g., air or hydraulic) rotors, a combination thereof, and others.

The first tag interface 208 and the second tag interface 212 can be a respective socket or a respective bit having a geometry that corresponds to (i.e., mates with) a head of the male portion 104 and a head of the female portion 106 of the tag respectively. Any suitable structure for each respective tag interface (and the corresponding structure of the male portion 104 and the female portion 106) can be used, and the structure of the first tag interface 208 can be either the same as, or different than, the structure of the second tag interface 212. Example structures for the tag interfaces 208, 212 include, respectively, a socket or bit, including but not limited to a socket or bit having a hex, square, and star right prism geometry.

The second tag interface 212 is defined in an arm 214 of the body 202. The arm 214 extends from the main portion 204 of the body 202, outward past the first tag interface 208. The second tag interface 212 is disposed on the arm 214, opposite the first tag interface 208. The second tag interface 208 is aligned with the first tag interface 208, such that the male portion 104 of the tag mounted on the first tag interface 208 is disposed in an aligned and opposing relationship with the female portion 106 of the tag mounted on the second tag interface 212. An aligned and opposing relationship is an orientation in which the male portion 104 if moved in a direction parallel to its longitudinal axis (coincident with axis 210) will properly connect with the female portion 106 of the tag.

The arm 214 can be an immobile member that rigidly connects the second tag interface 212 to the main portion 204 of the body 202, such that the second tag interface 214 is stationary with respect to the main portion 204. Since the first tag interface 208 moves along the rotation axis 210 and the second tag interface 212 is aligned with the rotation axis 210, the stationary position of the second tag interface 212 will remain aligned with and opposed to the first tag interface 208 while the first tag interface 208 is moving during activation of the tool 100. This relative disposition enables the male portion 104 of the tag during activation of the tool 100 to move towards and connect with the female portion 106 of the tag as described above.

The arm 214 can be spaced apart from the rotation axis 210 of the first tag interface 208 to provide space for a user to mount the male portion 104 and the female portion 106 in their respective tag interface 208, 212 of the tool 100. The arm 214 can have a curved or otherwise angled geometry to be spaced apart from the rotation axis 210 in the region between the first tag interface 208 and the second tag interface 212, while still reaching the position of the second tag interface 212, which is disposed on the rotation axis 210. In an example, the arm 214 is disposed at least 1 inch away from the rotation axis 210 in the region between the first tag interface 208 and the second tag interface 212. The second tag interface 212 can be disposed on a distal portion of the arm 214. A clip 220 can be include on the arm 214 to hold the female portion 106 of the tag in place on the tool 100. The clip 220 can provide force against the female portion 106 holding the in the second tag interface 212. The clip 220 can also flex outward to allow the female portion 106 to be more easily removed from the second interface 212 after the tag is attached to the animal.

The body 202 can also include a guard 216 that extends from the main portion 204 of the body 202 proximate the first tag interface 208, along the rotation axis 210 toward the second tag interface 212. The guard 216 can extend out past the first tag interface 208 a distance at least as far as the length of the male portion 102 of the tag, such that the guard 216 protects against inadvertent contact with the male portion 102 of the tag from the side (tangential to the rotation axis 210), while the male portion 104 is mounted on the first tag interface 208. The guard 216 can be disposed opposite of the arm 214 with respect to the rotation axis 210, such that the male portion 102 is disposed between the guard 216 and the rotation axis 210 while mounted on the first tag interface 208, with the first tag interface 208 in its retracted position. The "retracted position" of the first tag interface 208 is the position in which the first tag interface 208 is far from the second tag interface 212 and is the opposite position of the "extended position" in which the first tag interface 208 is near the second tag interface 212. Thus, the guard 216 can protect against inadvertent contact, which may knock the male portion 104 out of the first tag interface 208, while the attachment tool 100 is being positioned on the animal.

A distal end of the guard 216 is disposed a distance away from the second tag interface 212 to provide an opening into which the portion of the animal to which the tag is to-beattached can be inserted. In an example, the guard 216 extends at least 1 inch outward of the first tag interface 208. The distal end of the guard 216 and an opposing portion of the arm 214 proximate the second tag interface 212 define a gap 222 that is at least 2 inches long. The gap 222 provides an opening to the region between the male portion 104 and the female portion 106 of the tag. This opening provides a space for the portion of the animal to which the tag is to-be-attached to be disposed therein. Thus, the portion of the animal to which the tag is to-be-attached can be disposed between the male portion 104 of the tag and the female portion 106 of the tag for attachment thereto. In an example, the gap 222 is between 2 and 7 inches long (parallel with the longitudinal axis of the male portion 104).

In an example, a guard (e.g., similar to, albeit smaller than, guard 216) can be disposed on the arm 214 proximate the female portion 106 of the tag to protect the female portion 106 from inadvertent contact knocking the female portion 106 out of the second tag interface 106. In such an example, the gap 222 can be the space defined between the distal end of the guard proximate the female portion 106 and the distal end of the guard 216 proximate the male portion 104.

The guard 216 and any guard for the female portion 106 along with the clip 222 are beneficial for a tag that is applied to the dewlap or brisket region of a cow because the tool with the tag installed is positioned and held next to the (likely standing) cow's dewlap in between the male portion 104 and the female portion 106 without knocking either the male portion 104 or the female portion 106 out of the tool 100. This is more of an issue that with ear tags, as the tool with tag is held much closer to the main body (brisket) of the cow during attachment to the brisket as opposed to attachment to an ear tag where the only body part near the tool is the ear, which is less likely to knock out the tag.

The tool 100 can be configured to fit multiple size tags, such that both a smaller tag (e.g., shorter male portion 104) can be used as well as a larger tag (e.g., longer male portion 104). A smaller tag can be used, for example, for a calf, and a larger tag can be used for a full-grown cow.

The body 202 can also include a brace 218 that extends from the main portion 204 and contacts a body of the rotary tool 102 to hold the body 202 of the tool 100 stationary with respect to the body of the rotary tool 102 while the chuck, shank 206, and first tag interface 208 are rotating. As used herein, the body of the rotary tool 102 refers to an outer portion of the rotary tool 102 that does not rotate, but which the chuck rotates with respect to. The brace 218 can take any suitable form that has sufficient contact with the body of the rotary tool 102 to enable the body 202 of the tool 100 to resist rotation while the shank 206 and first tag interface 208 are rotating. In an example, the brace 218 is a set of elongated members that extend past and around a backside of the rotary tool 102. In particular, the elongated members can extend around a portion of the rotary tool 102 that extends perpendicularly to the rotation axis 210. This configuration provides contact between the elongated members and the perpendicular portion of the rotary tool 102 which prevents the body 202 of the tool 100 from rotating. In an implementation of this example, the perpendicular portion of the rotary tool 102 is a portion that is a handle or extends toward a handle of the rotary tool 102. In another example, the brace 218 includes a clamp that clamps to the body of the rotary tool 102. An implementation of such a clamp is a pipe clamp having two sides that clamp around the end of the rotary tool near the chuck. The two sides of the clamp can be tightened against the rotary tool by a suitable fastener (e.g., bolt and nut). Other examples for the brace are also possible. The brace 218 can also be configured so that it is universally adaptable, in that the brace 218 is able to be successfully secured onto many different rotary tools.

Figure 4:
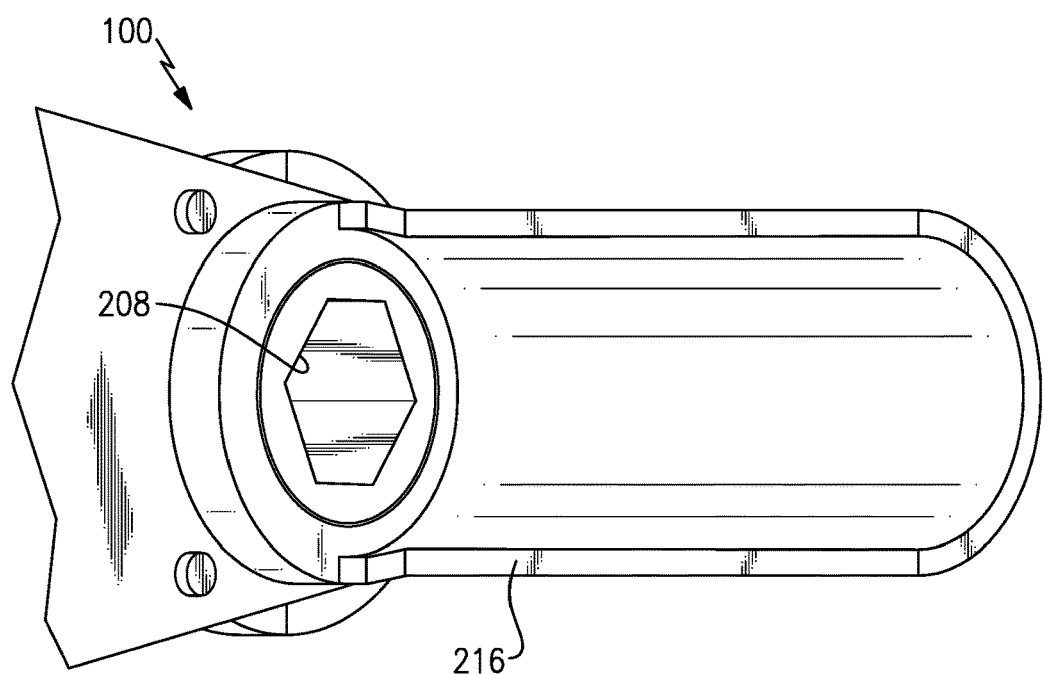
FIG. 4 is a perspective view of a first tag interface and a guard of the attachment tool of FIG. 2.
Figure 5:
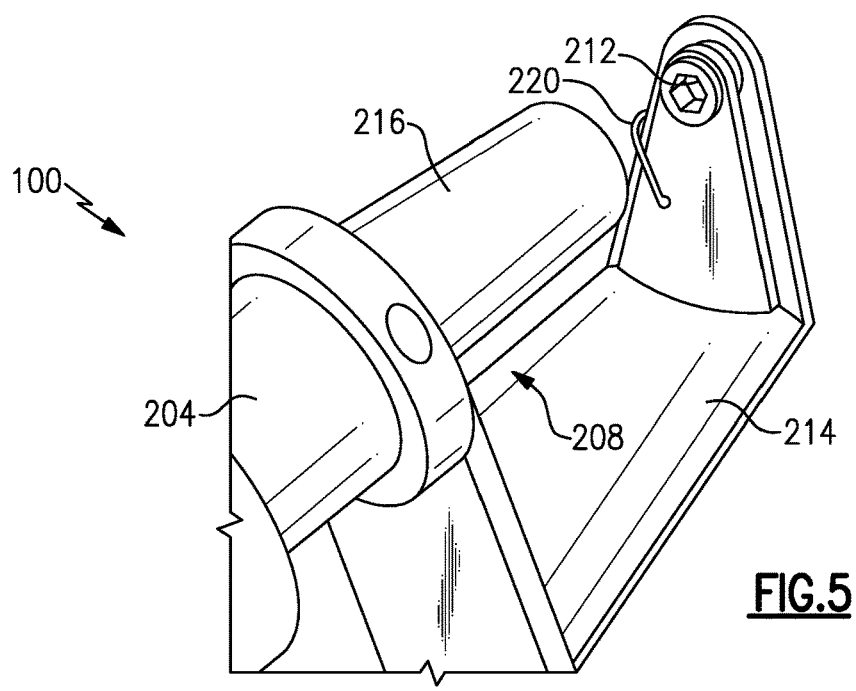
FIG. 5 is a perspective view of a second tag interface of the attachment tool of FIG. 2.

FIG. 4 is another perspective view of the tool 100 showing the first tag interface 208. In this example, the first tag interface 208 is a socket having a hex geometry. FIG. 5 is another perspective view of the tool 100 showing the second tag interface 212. In this example, the second tag interface 212 is also a socket having a hex geometry.

Figure 6:
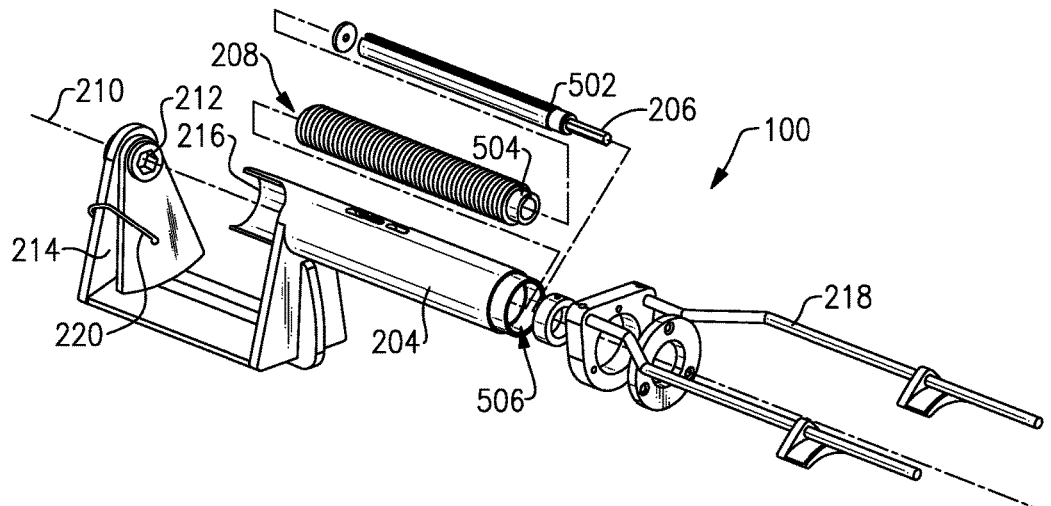
FIG. 6 is an exploded view of the attachment tool of FIG. 2.

FIG. 6 is an exploded view of an example drive linkage including a gear drive and the body 202. The drive linkage includes a shaft 502 that defines or is connected to the shank 206 on one end thereof. Rotation of the shank 206 rotates the shaft 502. The shaft 502 couples the rotation of the shank 206 to an inner cylinder 504. The inner cylinder 504 can define a hollow interior extending longitudinally along the cylinder. The shaft 502 can be disposed inside the hollow interior of the inner cylinder 504.

The inner cylinder 504 defines one or more external threads that mate with one or more internal threads defined in an outer chamber 506 (part of the main portion 204 of the body 202) in which the inner cylinder 504 is disposed. The mating internal and external threads drive the inner cylinder 504 axially along the rotation axis 210 relative to the main portion 204 of the body 202 when the inner cylinder 504 rotates about the rotation axis 210. Since the body 202 is secured to the body of the rotary tool 102 during operation, and the inner cylinder 504 is coupled to the shank 206, activation of the rotary tool 102 causes the inner cylinder 504 to both rotate about the rotation axis 210 and move axially along the rotation axis 210. The inner cylinder 504 is keyed to the shaft 502. The key couples the rotation of the shaft 502 to the inner cylinder 504, and allows the inner cylinder 504 to slide along the key as the inner cylinder 504 moves axially with respect to the shaft 502.

The first tag interface 208 can be disposed on an end of the inner cylinder 504 that is distal from the shank 206. When the tool 100 is assembled, the first tag interface 208 on the inner cylinder 504 is exposed at the end of the main portion 204 of the body 202 that is distal from the shank 206. The rotation and axial movement of the inner cylinder 504 about and along the rotation axis 210 correspondingly rotates the first tag interface 208 about the rotation axis 210 and moves the first tag interface 208 axially along the rotation axis 210 towards the second tag interface 212 as described above.

During operation, the male portion 104 and the female portion 106 of the tag can be mounted on the first and second tag interface 208, 212 respectively while the inner cylinder 504, and correspondingly the first tag interface 208, is in the retracted position. The rotary tool 102 can then be activated to rotate and extend the inner cylinder 504 outward from the main portion 204 along the rotation axis 210. Once the male portion 104 is connected to the female portion 106 and the tag is removed from the tool 100, the inner cylinder 504 can be retracted back to the retracted position for mounting of another tag if desired.

In an example, the drive linkage can automatically stop rotating and/or moving the inner cylinder 504 along the rotation axis 210 when the inner cylinder 504 reaches the extended position. The extended position can correspond with the position of the male portion 104 of the tag when the male portion 104 connects to the female portion 106 of the tag. Thus, even while activation of the rotary tool 102 continues and the shank 206 continues to rotate, the inner cylinder 504 can stop when the male portion 104 reaches the position where the male portion 104 is connected to the female portion 106. In an implementation of this example, the drive linkage can automatically stop moving the inner cylinder 504 by using a clutch that selectively de-couples the inner cylinder 504 or shaft 502 from the shank 206. The clutch can couple the inner cylinder 504 to the shaft 502 or can couple the shaft 502 to the shank 206 during movement of the inner cylinder 504 from the retracted position to the extended position. The clutch can be activated when the inner cylinder 504 reaches the extended position to de-couple the inner cylinder 504 or shaft 502 from the shank 206. De-coupling the inner cylinder 504 or shaft 502 from the shank 204 causes the inner cylinder 504 or shaft 502 to stop moving even if the shank 204 continues to rotate. In other examples, the drive linkage does not automatically stop, relying instead on manual stopping by the user, or on a rotary tool clutch, to stop further rotation of the shank 206 when the male portion 104 is connected to the female portion 106.

In an example, the inner cylinder 504 can automatically retract back to the retracted position after the inner cylinder 504 has reached the position where the male portion 104 is connected to the female portion 106. That is, through continued activation of the rotary tool 102 and rotation of the shank 206 in the same direction as was used to extend the inner cylinder 504 from the retracted position to the extended position, the drive linkage can cause the inner cylinder 504 to move back to the retracted position once again. In an implementation of this example, the clutch that de-couples the inner cylinder 504 or shaft 502 from the shank 206 can also allow a spring connected to the inner cylinder 504 or shaft 502 to pull the inner cylinder 504 back to the retracted position, once the clutch has de-coupled the inner cylinder 504 or shaft 502 from the shank 206. In other examples, the drive linkage does not automatically retract, relying instead on the user to manually reverse the direction of rotation of the rotary tool 102 to move the inner cylinder 504 back to the retracted position.

Although some example configurations for the drive linkage have been discussed, other configurations can also be used. The tool 100 can be composed of any suitable material, including metals and plastics.

Figure 7:
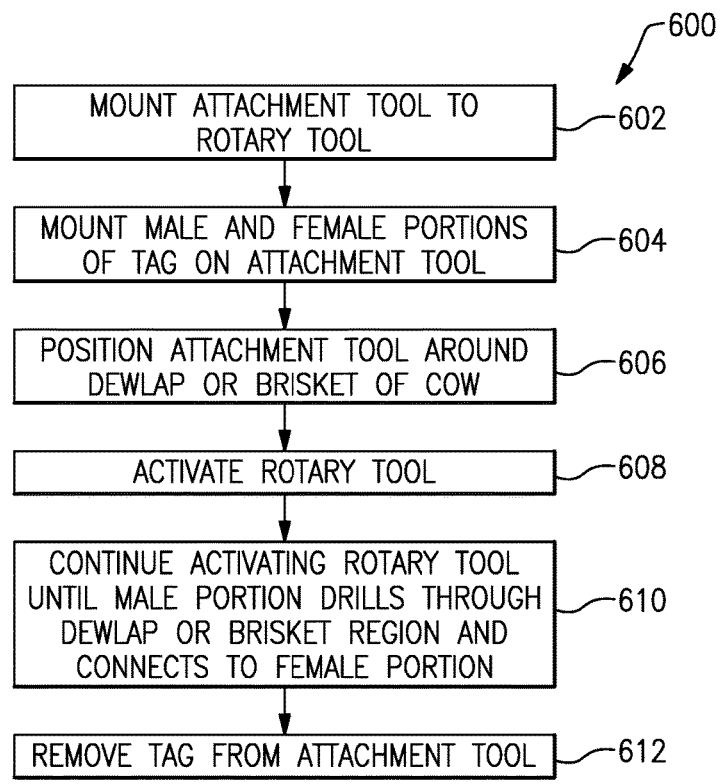
FIG. 7 is a flow diagram of an example method of using the attachment tool of FIG. 2.

FIG. 7 is a flow diagram of an example method 600 of using the tool 100. The tool 100 can be mounted to a rotary tool 102 (block 602). In an example, the tool 100 is mounted to the rotary tool 102 by disposing the brace 218 in the proper position relative to the rotary tool 102 and securing the brace 218. For the example brace 218 shown in FIG. 2, the brace 218 is disposed with its elongated members extending past the handle of the rotary tool 102. The distal ends of the elongated members are connected together around a backside of the handle to secure the brace 218 to the rotary tool. Mounting the tool 100 also includes securing the shank 206 of the tool 100 in the chuck of the rotary tool 102. The shank 206 is secured in the chuck by opening the chuck, placing the shank 206 in the chuck, and tightening the chuck onto the shank 206.

The male portion 104 and the female portion 106 of the tag are mounted in the tool 100 (block 604). The male portion 104 can be mounted by placing a head of the male portion 104 on the first tag interface 208. The female portion 106 can be mounted by placing a head of the female portion 106 on the second tag interface 208. The first and second sockets or bits 208, 212, can be sized to fit the heads of the male and female portions 104, 106 respectively, such that the male and female portions 104, 106 are held on their respective tag interface 208, 212 by friction. The friction can be sufficient to hold the male portion 104 and the female portion 106 in their respective tag interface 208, 212 while the tool 100 is positioned near the animal and the tool 100 is activated as discussed below The tool 100 can then be positioned with the portion of the animal to which the tag is to-be-attached in between the male portion 104 and the female portion 106 of the tag (block 606). In an example, the portion of the animal to which the tag is to-be-attached is a dewlap or brisket region of a cow. In particular, the tool 100 can be positioned such that a flap of skin in the dewlap or brisket region of a cow is disposed between the male portion 104 and the female portion 106 of the tag.

The rotary tool 102 can then be activated by the user to rotate the chuck (block 608). Rotation of the chuck causes the first tag interface 208 with the male portion 104 thereon to rotate and move axially towards the second tag interface 212 and the female portion 106 of the tag. The male portion 104 of the tag can have one or more sharp edges on a distal end thereof, such that as the male portion 104 moves and contacts the portion of the animal in between the male portion 104 and the female portion 106, the male portion 104 cuts into and through the portion of the animal. The rotary tool 102 can be continually activated until the male portion 104 extends entirely through the portion of the animal and connects with the female portion 106 of the tag (block 610).

Once the male portion 104 is connected to the female portion 106, the tag (now a single, connected structure) can be removed from the tool 102 and will remain attached to the animal (block 612).

What is claimed is:

1. An attachment tool for an animal tag, the attachment tool comprising:
   a first tag interface that mates with a male portion of the animal tag;
   a second tag interface that mates with a female portion of the animal tag,
   wherein the first tag interface and the second tag interface dispose the male portion of the tag in an aligned and opposing relationship with the female portion of the tag while the male portion of the tag is mounted on the first tag interface and the female portion of the tag is mounted on the second tag interface;
   an arm extending adjacent the first tag interface to at least the second tag interface, wherein the second tag interface is disposed on the arm;
   a guard extending outward proximate the first tag interface toward the second tag interface, wherein a distal portion of the guard and an opposing structure of the arm proximate the second tag interface define a gap therebetween, the gap extending into a region between the first tag interface and the second tag interface;
   a drive that moves the male portion of the animal tag disposed on the first tag interface towards the female portion of the tag disposed on the second tag interface to connect the male portion with the female portion; and
   a main portion housing the drive and the first tag interface,
   wherein the arm extends from the main portion, the arm connecting the second tag interface to the main portion, the arm extending along a first longitudinal side of the male portion of the tag while the male portion is mounted on the first tag interface,
   wherein the guard extends along a second longitudinal side of the male portion while the male portion is mounted on the first tag interface, the second longitudinal side reverse of the first longitudinal side.

2. The attachment tool of claim 1, wherein the arm is spaced farther from the male portion of the tag than the guard to allow placement of the male portion in the first tag interface.

3. The attachment tool of claim 1, wherein the guard extends outward at least 1 inch from the first tag interface.

4. The attachment tool of claim 3, wherein the gap is at least 2 inches in length, such that the distal end of the guard is at least 2 inches from the opposing structure of the arm.

5. The attachment tool of claim 1, wherein the drive includes a linear actuator that provides linear motion without rotation.

6. The attachment tool of claim 1, wherein the drive includes a linear actuator that provides linear motion with rotation.

7. An attachment tool for an animal tag, the attachment tool comprising:
a first tag interface having a geometry that mates with a male portion of the animal tag;
a second tag interface having a geometry that mates with a female portion of the animal tag,
wherein the first tag interface and the second tag interface dispose the male portion of the tag in an aligned and opposing relationship with the female portion of the tag while the male portion of the tag is mounted on the first tag interface and the female portion of the tag is mounted on the second tag interface;
a shank; and
a drive linkage coupling the shank to the first tag interface, the drive linkage rotating the first tag interface when the shank is rotated, the drive linkage also moving the first tag interface axially toward the second tag interface while rotating the first tag interface when the shank is rotated.

8. The attachment tool of claim 7, wherein the drive linkage moves the first tag interface toward the second tag interface at least 1 inch.

9. The attachment tool of claim 7, comprising:
a brace that contacts a body of a rotary tool to hold the second tag interface stationary with respect to the body of the rotary tool while the shank and the first tag interface are rotating.

10. The attachment tool of claim 7, comprising:
a guard extending outward at least 1 inch from first tag interface toward the second tag interface.

11. The attachment tool of claim 10, comprising a tool body including:
a main portion housing the shank, the drive linkage, and the first tag interface, wherein the shank, the drive linkage, and the first tag interface rotate relative to the main portion while activated by a rotary tool;
an arm extending from the main portion, the arm connecting the second tag interface to the main portion, the arm extending on a first side of the male portion of the tag while the male portion is installed on the first tag interface,
wherein the guard covers a second side of the male portion while the male portion is mounted on the first tag interface, the second side reverse of the first side.

12. The attachment tool of claim 7, comprising a tool body including:
an outer chamber defining internal threads;
wherein the drive linkage includes:
an inner cylinder disposed in the outer chamber, the inner cylinder defining external threads that mate with the internal threads of the outer chamber, wherein interaction between the internal threads and the external threads during rotation of the inner cylinder causes the inner cylinder to move axially with respect to the outer chamber, wherein the first tag interface is disposed on the inner cylinder; and
a shaft having the shank thereon, wherein the shaft is keyed to the inner cylinder such that the inner cylinder rotates with the shank and is allowed to move axially with respect to the shaft.

13. A method for an attachment tool to attach a tag to an animal, the attachment tool including a first tag interface disposed in an opposing and aligned relationship to a second tag interface, the method comprising:
rotating the first tag interface with a male portion of the tag disposed thereon; and
moving the first tag interface along its axis of rotation towards the second tag interface opposite of the first tag interface, the second tag interface having the female portion of the tag disposed thereon, wherein the first tag interface moves a distance sufficient to connect the male portion of the tag to the female portion.

14. The method of claim 13, wherein rotating the first tag interface includes:
coupling rotation of a shank of the attachment tool to the first tag interface, such that the first tag interface rotates along with the shank, the shank coupled to a rotary tool to provide rotational power to the shank.

15. The method of claim 14, wherein coupling of rotation of the shank to the first tag interface includes:
rotating a shaft along with the rotation of the shank;
rotating an inner cylinder having the first tag interface along with the shaft; and
moving the inner cylinder axially with respect to the shaft when the inner cylinder rotates along with the shaft.

16. An attachment tool for attaching an animal tag to an animal, the attachment tool comprising:
a main portion;
a first tag interface configured to have a first portion of a tag disposed thereon, the first tag interface disposed proximate the main portion;
an arm extending from the main portion;
a second tag interface configured to have a second portion of the tag disposed thereon, the second tag interface disposed on the arm and disposed opposite the first tag interface;
wherein the first tag interface simultaneously rotates and moves towards the second tag interface to connect the first portion of the tag to the second portion of the tag.

17. The attachment tool of claim 16 comprising:
a shank for grasping by a chuck of a rotary tool, wherein the attachment tool couples rotation of the shank to the first tag interface.

18. The attachment tool of claim 17, comprising:
a drive linkage coupling the shank to the first tag interface, the drive linkage rotating the first tag interface when the shank is rotated, the drive linkage also moving the first tag interface axially toward the second tag interface while rotating the first tag interface when the shank is rotated.

19. The attachment tool of claim 18, wherein the drive linkage moves the first tag interface toward the second tag interface at least 1 inch.

20. The attachment tool of claim 16, comprising:
a brace that contacts a body of the rotary tool to hold the second tag interface stationary with respect to the body of the rotary tool while the shank and the first tag interface are rotating.

21. The attachment tool of claim 16, comprising:
a guard extending outward at least 1 inch from first tag interface toward the second tag interface.

22. The attachment tool of claim 21, wherein the arm provides incidental contact protection for a first side of the first tag interface,
wherein the guard provides incidental contact protection for a second side of the first tag interface, the second side opposite of the first side.

23. The attachment tool of claim 22, wherein the arm is spaced farther from the first tag interface than the guard to allow placement of the first portion of the tag in the first tag interface.

24. The attachment tool of claim 16, wherein the main portion includes:
an outer chamber defining internal threads;
an inner cylinder disposed in the outer chamber, the inner cylinder defining external threads that mate with the internal threads of the outer chamber, wherein interaction between the internal threads and the external threads during rotation of the inner cylinder causes the inner cylinder to move axially with respect to the outer chamber, wherein the first tag interface is disposed on the inner cylinder; and
a shaft having the shank thereon, wherein the shaft is keyed to the inner cylinder such that the inner cylinder rotates with the shank and is allowed to move axially with respect to the shaft.

25. The attachment tool of claim 16, comprising:
a built-in power source, the power source coupled to the first tag interface to rotate the first tag interface and move the first tag interface axially when activated.

\* \* \* \* \*